United States Patent
Kaku et al.

(10) Patent No.: US 8,905,168 B2
(45) Date of Patent: Dec. 9, 2014

(54) UTILITY VEHICLE

(75) Inventors: Hidetoshi Kaku, Lincoln, NE (US); Chad Enger, Omaha, NE (US); Brian Butler, Gretna, NE (US); Yoshinori Tsumiyama, Miki (JP); Jun Takagi, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 321 days.

(21) Appl. No.: 13/267,686

(22) Filed: Oct. 6, 2011

(65) Prior Publication Data

US 2013/0087395 A1 Apr. 11, 2013

(51) Int. Cl.
- B60K 13/02 (2006.01)
- B60K 20/00 (2006.01)
- B60N 3/02 (2006.01)
- B60K 20/02 (2006.01)
- B60K 20/04 (2006.01)
- B60N 2/005 (2006.01)

(52) U.S. Cl.
CPC . *B60K 20/02* (2013.01); *B60N 3/02* (2013.01); *B60K 20/04* (2013.01); *B60N 2/005* (2013.01)
USPC .................. 180/68.3; 180/293; 296/24.34

(58) Field of Classification Search
USPC .............. 180/68.1–68.3, 69.1, 293; 296/1.02, 296/1.09, 24.34, 24.46, 37.14, 37.8
See application file for complete search history.

(56) References Cited

U.S. PATENT DOCUMENTS

| | | | |
|---|---|---|---|
| 5,730,495 A * | 3/1998 | Tuman, II | 297/331 |
| 5,970,814 A * | 10/1999 | Smith et al. | 74/473.15 |
| 6,582,004 B1 * | 6/2003 | Hamm | 296/65.08 |
| 6,659,900 B2 * | 12/2003 | Nagasaka et al. | 475/132 |
| 7,168,516 B2 * | 1/2007 | Nozaki et al. | 180/68.3 |
| 7,341,297 B2 * | 3/2008 | Nakamura et al. | 296/24.34 |
| 7,357,211 B2 * | 4/2008 | Inui | 180/266 |
| 7,438,147 B2 * | 10/2008 | Kato et al. | 180/68.1 |
| 7,506,712 B2 * | 3/2009 | Kato et al. | 180/68.3 |
| 7,690,462 B2 * | 4/2010 | Kato et al. | 180/68.3 |
| 7,690,472 B2 * | 4/2010 | Kato et al. | 180/291 |
| 7,722,102 B2 * | 5/2010 | Hansen et al. | 296/24.34 |
| 7,753,427 B2 * | 7/2010 | Yamamura et al. | 296/63 |
| 7,793,764 B2 * | 9/2010 | Fujimoto et al. | 188/71.4 |
| 7,926,862 B2 * | 4/2011 | Smith et al. | 296/64 |
| 8,096,621 B2 * | 1/2012 | Braun | 297/440.15 |
| 8,215,443 B2 * | 7/2012 | Miura | 180/296 |
| 8,381,855 B2 * | 2/2013 | Suzuki et al. | 180/68.3 |
| 8,434,580 B2 * | 5/2013 | Azuma | 180/68.3 |
| 8,540,298 B2 * | 9/2013 | Vasko et al. | 296/24.34 |
| 2007/0018471 A1 * | 1/2007 | Pandura | 296/1.02 |
| 2013/0049390 A1 * | 2/2013 | Stachura et al. | 296/24.34 |
| 2013/0087402 A1 * | 4/2013 | Kaku et al. | 180/309 |

* cited by examiner

*Primary Examiner* — J. Allen Shriver, II
*Assistant Examiner* — Travis Coolman
(74) *Attorney, Agent, or Firm* — Alleman Hall McCoy Russell & Tuttle LLP

(57) ABSTRACT

A utility vehicle comprises a driver seat; a passenger seat positioned such that the passenger seat and the driver seat are arranged side by side in a rightward and leftward direction; a console box provided between the driver seat and the passenger seat; a shift lever operated by a driver to perform a shifting operation; and a grab member provided in the vicinity of the passenger seat and secured to the vehicle body frame; wherein the shift lever is provided between the driver seat and the passenger seat and is positioned closer to the driver seat than a center of the console box in the rightward and leftward direction; and the grab member is provided between the driver seat and the passenger seat and is positioned closer to the passenger seat than the center of the console box in the rightward and leftward direction.

4 Claims, 8 Drawing Sheets

UTILITY VEHICLE

BACKGROUND OF THE INVENTION

1. Field of the Invention

The present invention relates to a utility vehicle having an off-road mobility. In particular, the present invention relates to a utility vehicle including a driver seat on which a driver is seated, a passenger seat on which a passenger is seated, a plurality of driving operation members arranged in the vicinity of the driver seat, and a grab member disposed in the vicinity of the passenger seat.

2. Description of the Related Art

U.S. Pat. No. 7,793,764 discloses a utility vehicle including a driver seat and a passenger seat which are arranged side by side in a rightward and leftward direction. In the vicinity of the driver seat, a plurality of driving operation members are arranged. The driving operation members include, for example, a brake pedal for braking primarily in driving and temporary stop, a parking brake lever for braking primarily in parking, and a shift lever for changing a transmission ratio position. A grab member is disposed in the vicinity of the passenger seat. The grab member is attached onto, for example, an upper frame of a vehicle body frame at an outer side in the vehicle width direction when viewed from the passenger seat.

If the grab member is positioned between the right and left seats, the passenger can grab the grab member using a hand (left hand when the passenger seat is located at the right side) closer to the center in the vehicle width direction. In some utility vehicles, the shift lever and the parking brake lever are arranged between the right and left seats so that the driver can operate them with a hand (right hand when the driver seat is located at the left side) closer to the center in the vehicle width direction. In this arrangement, the grab member could be close to the driving operation members between the right and left seats.

SUMMARY OF THE INVENTION

The present invention addresses the above described condition, and an object of the present invention is to provide a configuration for enabling a passenger to easily grab a grab member even when the grab member is relatively near driving operation members used to drive the utility vehicle.

According to the present invention, a utility vehicle comprises a driver seat; a passenger seat positioned such that the passenger seat and the driver seat are arranged side by side in a rightward and leftward direction; a console box provided between the driver seat and the passenger seat; a shift lever operated by a driver to perform a shifting operation; and a grab member provided in the vicinity of the passenger seat and secured to the vehicle body frame; wherein the shift lever is provided between the driver seat and the passenger seat and is positioned closer to the driver seat than a center of the console box in the rightward and leftward direction; and the grab member is provided between the driver seat and the passenger seat and is positioned closer to the passenger seat than the center of the console box in the rightward and leftward direction.

In accordance with the above configuration, the shift lever is positioned between the driver seat and the passenger seat and closer to the driver seat than the center of the console box in the rightward and leftward direction. Because of this arrangement, the driver can operate the shift lever to change a transmission ratio position with a hand close to the center in the vehicle width direction. In contrast, the grab member is positioned between the driver seat and the passenger seat and closer to the passenger seat than the center of the console box in the rightward and leftward direction. Thus, the grab member is positioned as close as possible to the passenger seat and away from the shift lever in the rightward and leftward direction. This allows the passenger to easily grab the grab member.

The above and further objects, features and advantages of the invention will be more fully apparent from the following detailed description with reference to the accompanying drawings.

DETAILED DESCRIPTION OF THE PREFERRED EMBODIMENTS

Figure 1:
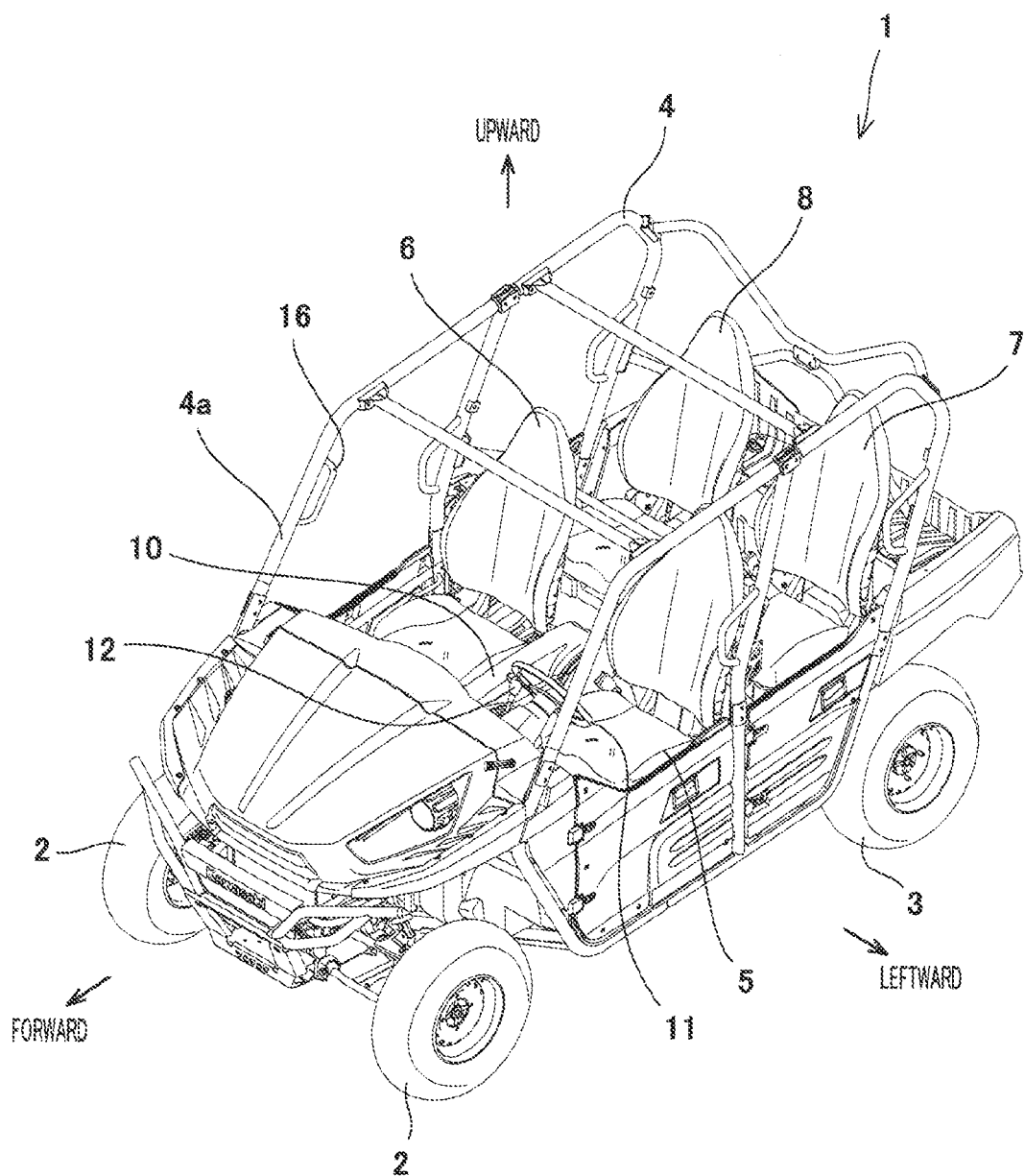
FIG. 1 is a perspective view showing an external appearance of a utility vehicle according to an embodiment of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the utility vehicle unless otherwise explicitly noted.

FIG. 1 is a perspective view showing an external appearance of a utility vehicle 1 according to an embodiment of the present invention. Referring to FIG. 1, the utility vehicle 1 is intended for four persons and has four wheels. The utility vehicle 1 has an off-road mobility. The utility vehicle 1 is capable of driving off-road, for example, over a bumpy road, or a muddy road. The utility vehicle 1 includes a pair of right and left front wheels 2, a pair of right and left rear wheels 3, a vehicle body frame 4, a driver seat 5, a passenger seat 6, a left rear seat 7 and a right rear seat 8. The front wheels 2 are suspended from the front portion of the vehicle body frame 4, while the rear wheels 3 are suspended from the rear portion of the vehicle body frame 4. The four seats 5-8 are mounted onto the vehicle body frame 4, and are arranged between the front wheels 2 and the rear wheels 3 in a forward and rearward direction, i.e., longitudinal direction of the utility vehicle 1.

The driver seat 5 and the passenger seat 6 are arranged side by side in a rightward and leftward direction (vehicle width direction). Although the driver seat 5 is disposed at the left side and the passenger seat 6 is disposed at the right in the present embodiment, they may be reversed. The rear seats 7 and 8 are arranged side by side behind the driver seat 5 and the passenger seat 6, respectively. The console box 10 is provided between the driver seat 5 and the passenger seat 6.

The utility vehicle 1 includes a plurality of driving operation members operated by the driver to drive the utility vehicle 1. These driving operation members are arranged in the vicinity of the driver seat 5. The driving operation members include, for example, a steering wheel 11, an accelerator pedal (not shown), a brake pedal (not shown), a shift lever 12 and a parking brake lever 13 (see FIG. 2). The steering wheel 11 is steered by the driver. The accelerator pedal is used to adjust a magnitude of a driving power. The shift lever 12 is used to change a transmission ratio position. The brake pedal is primarily used to brake the utility vehicle 1 in driving and temporary stop. The parking brake lever 13 (see FIG. 2) is primarily used to perform a braking operation (hereinafter also referred to as "parking braking operation") in parking.

The steering wheel 11 is disposed in front of the driver seat 5 to allow the driver seated on the driver seat 5 to steer it with both hands stretched forward. The shift lever 12 and the parking brake lever 13 are mounted onto the console box 10 to allow the driver seated on the driver seat 5 to operate them with a hand (in the present embodiment, right hand) closer to the center in the vehicle width direction. The accelerator pedal and the brake pedal which are not shown are disposed below the steering wheel 11 to allow these pedals to be depressed by a foot of the driver seated on the driver seat 5.

The utility vehicle 1 includes a front brake (not shown) for braking the front wheels 2, and a rear brake (not shown) for braking the rear wheels 3. Upon the brake pedal being depressed, the front brake and the rear brake are actuated (activated), thereby braking the four wheels 2 and 3. The parking brake lever 13 (see FIG. 2) is coupled to the rear brake via a push-pull cable (not shown). Upon the parking brake lever 13 (see FIG. 2) being pulled up, the rear brake is driven via the push-pull cable, thereby generating a braking force applied to the rear wheel 3.

The utility vehicle 1 includes a plurality of grab members arranged in the vicinity of the passenger seat 6. In the present embodiment, two grab members 16 and 17 are arranged apart from each other in a rightward and leftward direction. The grab member 16 is positioned outward (rightward in the present embodiment) in the vehicle width direction relative to the passenger seat 6. The grab member 16 is welded to a portion of the vehicle body frame 4, i.e., a frame member 4a extending in a substantially vertical direction in a location forward and outward in the vehicle width direction relative to the passenger seat 6. The grab member 17 (see FIGS. 2 to 8) is positioned closer to the center (in the present embodiment, at the left side) in the vehicle width direction, than the passenger seat 6, as will be described in detail later. The passenger on the passenger seat 6 can grab the grab member 16 with a hand (in the present embodiment, right hand) which is at an outer side in the vehicle width direction, and can grab the grab member 17 with a hand (in the present embodiment, left hand) which is closer to the center in the vehicle width direction.

Figure 2:
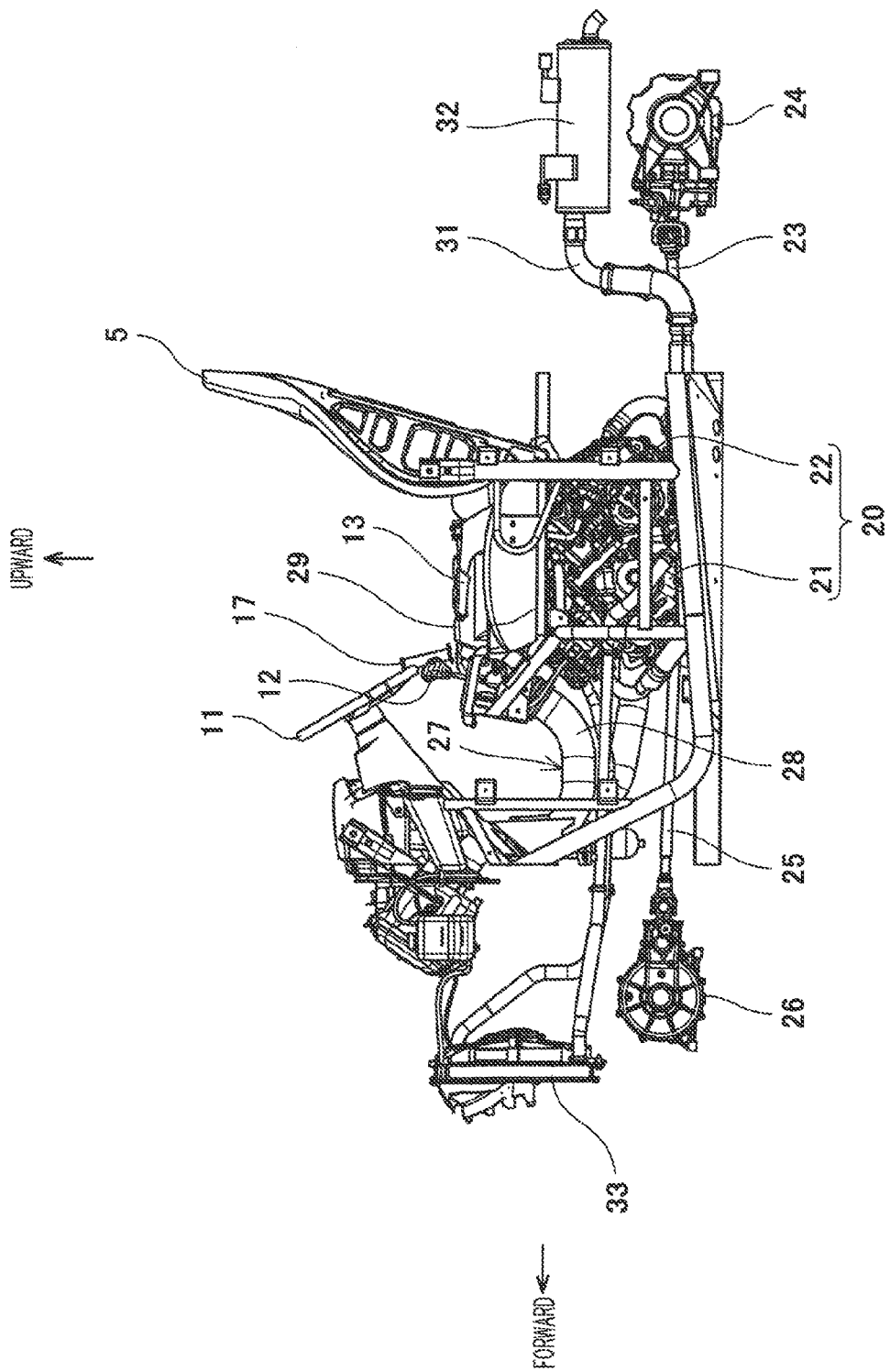
FIG. 2 is a left side view of the utility vehicle, in a state where some components, such as a console box, are omitted.

FIG. 2 is a left side view of the utility vehicle 1 from which a part of the components such as the console box 10, are omitted. Referring to FIG. 2, an engine unit 20 is disposed below the driver seat 5 and the passenger seat 6 (see FIG. 1). The engine unit 20 is an assembly including an engine 21 and a transmission 22 which are unitarily coupled together. A driving power of the engine 21 is transmitted to the right and left rear wheels 3 (see FIG. 1) via a rear propeller shaft 23 and a rear differential gear device 24, after its speed is changed by the transmission 22. Depending on the case, the driving power of the engine 21 is also delivered to the right and left front wheels 2 (see FIG. 1) via the transmission 22, a front propeller shaft 25 and a front differential gear device 26.

In the present embodiment, the engine 21 is, for example, a four-stroke, V-type two-cylinder, and water-cooled engine. Above and in front of the engine 21, an air-intake device 27 is disposed. The air-intake device 27 takes in air from outside and supplies it to the engine 21. The air-intake device 27 includes an air-intake pipe 28 and an air-intake chamber 29. The air-intake pipe 28 takes in air from outside and guides the air to the air-intake chamber 29. The air is supplied from the air-intake chamber 29 to each of cylinders of the engine 21 during an intake stroke of the cylinder. The air-intake chamber 29 is a device provided to mitigate a pulsation occurring in the air-intake. In FIG. 2, reference symbol 31 designates an exhaust pipe for guiding exhaust gas exhausted from the engine 21 to outside, reference symbol 32 designates a muffler coupled to the exhaust pipe 31, and reference symbol 33 designates a radiator for cooling cooling water used to cool the engine 21.

The transmission 22 is, for example, a V-belt automatic transmission. The driver shifts a position of the shift lever 12 to selectively set one from among a plurality of transmission ratio positions. The transmission ratio positions which can be set in the transmission 22, include, for example, a neutral ratio position, a forward driving first ratio position, a forward driving second ratio position, and a reverse driving ratio position. Note that the transmission 22 may be a hand-operated multi-gear transmission. In that case, a clutch pedal is provided in the vicinity of the driver seat 5.

Figure 3:
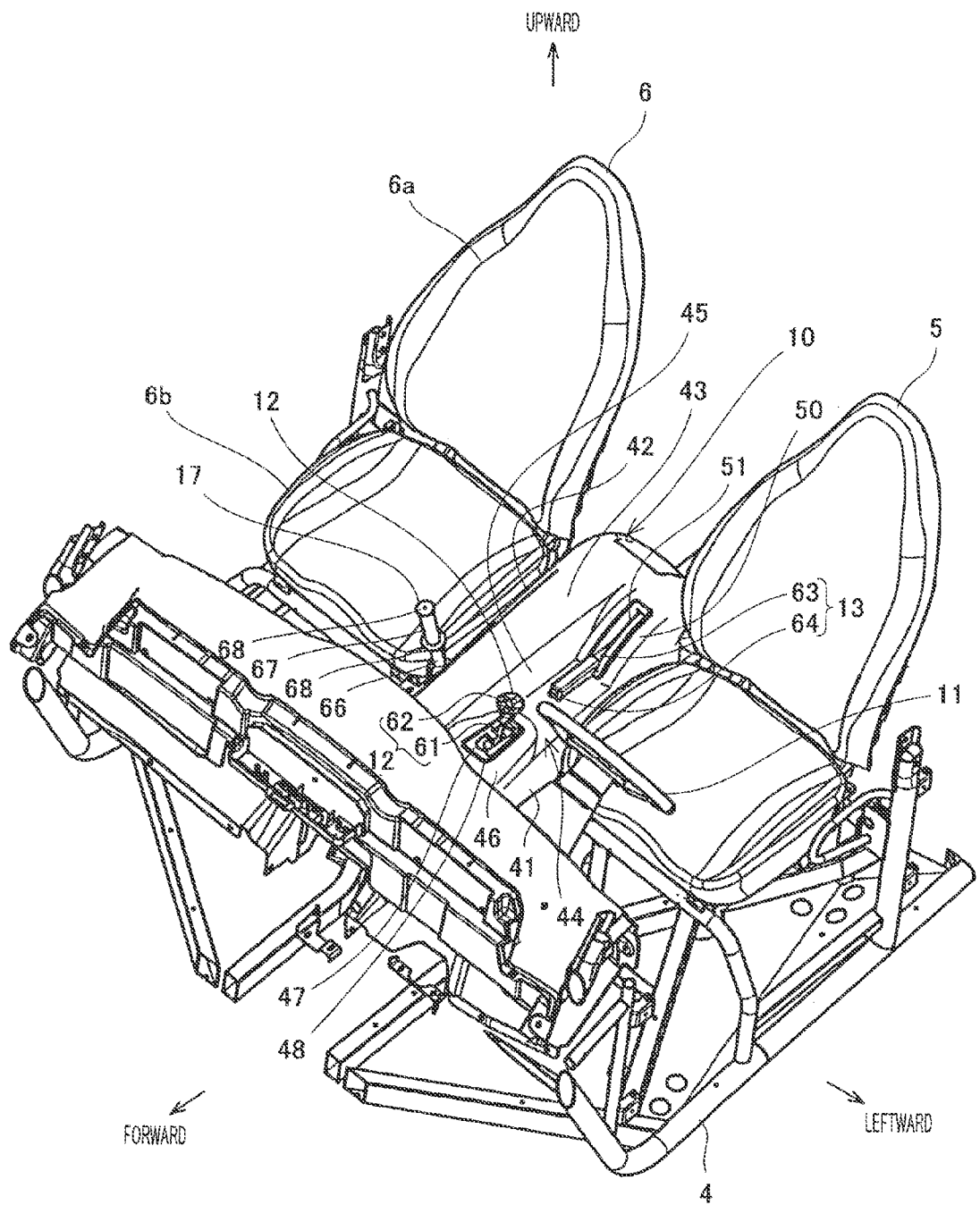
FIG. 3 is a perspective view showing an external appearance of a region surrounding a driver seat and a passenger seat of the utility vehicle.

FIGS. 3 to 6 are a perspective view, a plan view, a left side view and a right side view, respectively, showing a region surrounding the driver seat 5 and the passenger seat 6 of the utility vehicle 1. Referring to FIG. 3, the console box 10 has a left side wall 41, a right side wall 42, a console swelling section 43, and a lever mounting section 44. The left side wall 41 extends in a substantially vertical direction and in a substantially forward and rearward direction in a location closer to the driver seat 5 in the overall console box 10. The right side wall 42 extends in a substantially vertical direction and in a substantially forward and rearward direction in a location closer to the passenger seat 6 in the overall console box 10. The console swelling section 43 and the lever mounting section 44 form a top surface of the console box 10. The console swelling section 43 and the lever mounting section 44 are arranged side by side between the left side wall 41 and the right side wall 42, and extend in the substantially forward and rearward direction. The console swelling section 43 is located rightward relative to the lever mounting section 44. The console swelling section 43 is smoothly curved and is smoothly continuous with the upper edge of the right side wall 42. The lever mounting section 44 is smoothly curved and is smoothly continuous with the upper edge of the left side wall 41. The lever mounting section 44 is lower in height than the console swelling section 43. The console swelling section 43 has a vertical wall section 45 at a side where the lever mounting section 44 is present, i.e., at a left side. The upper surface of the console swelling section 43 is different in height from the upper surface of the lever mounting section 44. These upper surfaces are connected together by the vertical wall section 45.

Figure 4:
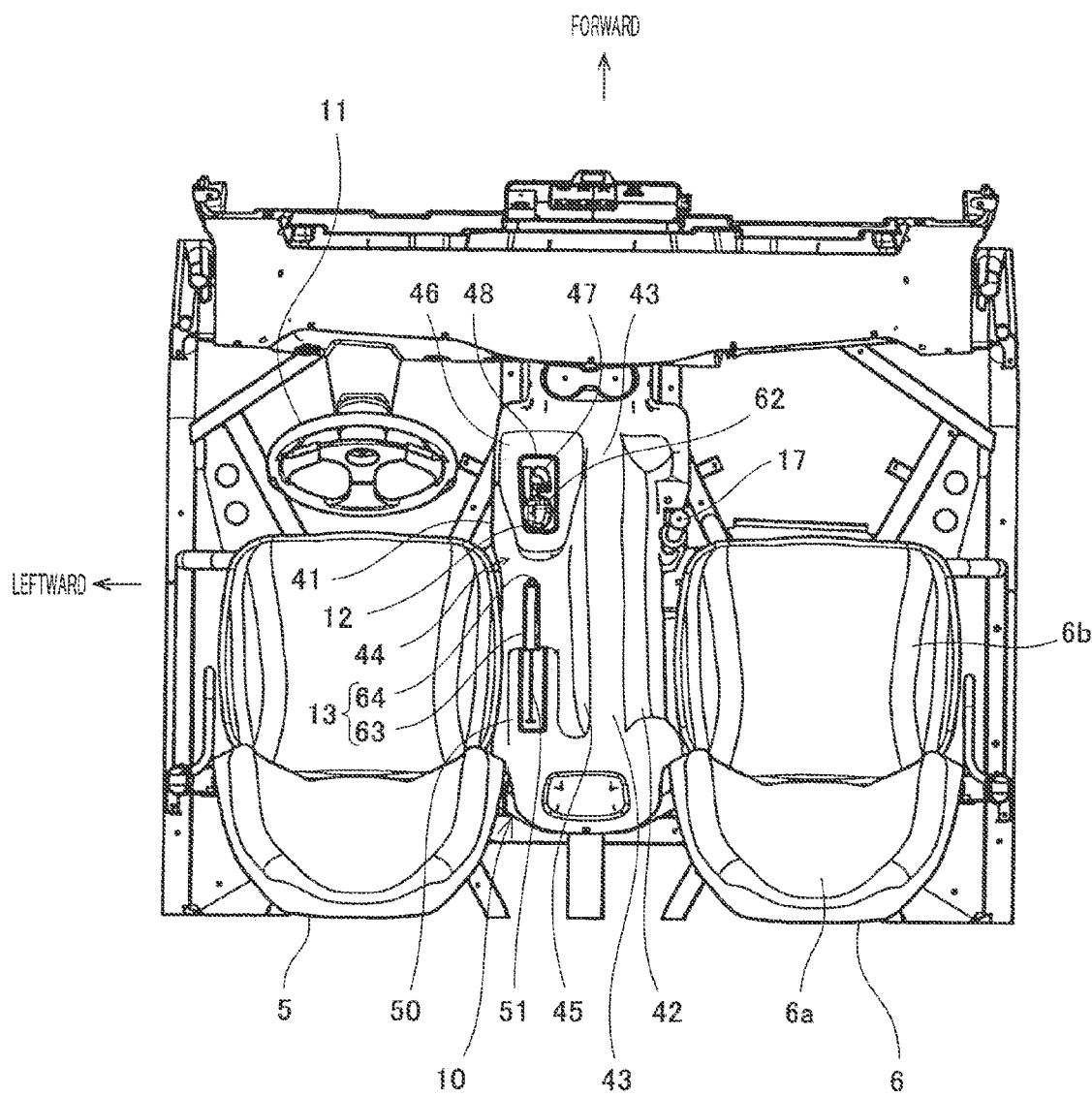
FIG. 4 is a plan view showing the region surrounding the driver seat and the passenger seat of the utility vehicle.
Figure 5:
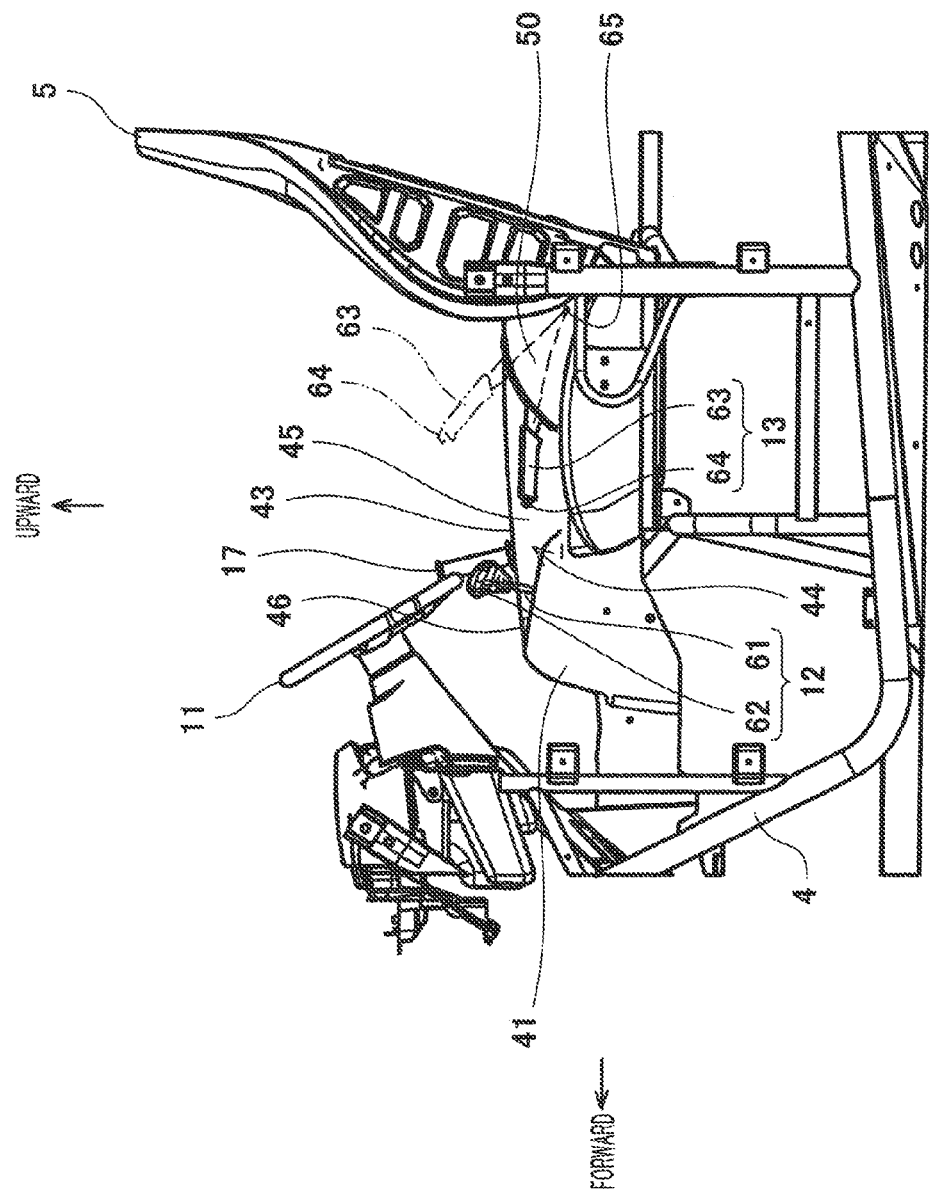
FIG. 5 is a left side view showing the region surrounding the driver seat and the passenger seat of the utility vehicle.

Referring to FIGS. 3 to 5, the shift lever 12 and the parking brake lever 13 are arranged closer to the driver seat 5 than the center of the console box 10 in the rightward and leftward direction. To be specific, the vertical wall section 45 of the console swelling section 43 extends in the substantially forward and rearward direction at a substantially center portion of the console box 10 in the rightward and leftward direction. The shift lever 12 and the parking brake lever 13 are positioned closer to the driver seat 5 than the vertical wall section 45, i.e., on the lever mounting section 44. The shift lever 12 and the parking brake lever 13 are substantially aligned in the forward and rearward direction on the lever mounting section 44, as viewed from above. The shift lever 12 is positioned in front of the parking brake lever 13.

The lever mounting section 44 has at a front portion thereof a front tilted section 46 which decreases in height in a rearward direction. The front tilted section 46 has a gate hole 47 for guiding the shift lever 12. In the present embodiment, the utility vehicle 1 includes a gate member 48 having the gate hole 47. The gate member 48 is welded to the vehicle body frame 4. The upper surface of the gate member 48 is exposed through an opening provided on the front tilted section 46, and is substantially coplanar with the upper surface of the front tilted section 46. The shift lever 12 includes a rod 61 protruding substantially upward through the gate hole 47, and a knob 62 attached to the upper end of the rod 61. The driver grabs the knob 62, moves the rod 61 along the gate hole 47 and stops moving the rod 61 in a suitable location. In this way, the driver can change the transmission ratio position.

The lever mounting section 44 has at a rear portion thereof, a rear tilted section 50 which decreases in height in a forward direction. The parking brake lever 13 includes a lever body 63 protruding through a slit 51 extending in a substantially center portion of the rear tilted section 50 in the rightward and leftward direction, and a press button 64 attached to the tip end of the lever body 63.

Referring to FIG. 5, the lever body 63 is pivotable between a braking or brake-actuated (brake-ON) position and a releasing or brake-unactuated (brake-OFF) position around a pivot 65 provided inside the rear tilted section 50 (to be precise, a position where the pivot 65 overlaps with the rear tilted section 50 as viewed from the side). With the lever body 63 being in the brake-ON position, the parking brake lever 13 extends through the upper end portion of the slit 51 (see FIG. 3) such that it is tilted forward and upward, and the rear brake (not shown) is driven to generate a braking force applied to the rear wheels 3 (see FIG. 1). On the other hand, with the lever body 63 being in the brake-OFF position, the parking brake lever 13 extends horizontally in a substantially forward direction through the lower end portion of the slit 51 (see FIG. 3). In this state, the actuation of the rear brake via the push-pull cable does not take place, and hence no braking force is applied to the rear wheels 3. By pressing the press button 64, the driver can pivot the parking brake lever 13 from the brake-ON position to the brake-OFF position.

FIG. 5 shows a state where the shift lever 12 is in a neutral position for setting the neutral transmission ratio position. When the driver gets off the utility vehicle 1, the driver shifts the shift lever 12 to the neutral position and then pulls up the parking brake lever 13 from the brake-OFF position to the brake-ON position, to actuate a brake device. In a state where the shift lever 12 is in the neutral position and the parking brake lever 13 is in the brake-ON position, the tip end of the parking brake lever 13 is located higher than the knob 62 of the shift lever 12. Because of this, the parking brake lever 13 easily catches the driver's eye when the driver is going to start the utility vehicle 1. Depending on the case, the arm of the driver which is about to reach the shift lever 12 might contact the parking brake lever 13. This suitably prevents a situation where the driver forgets to return the parking brake lever 13 to the brake OFF-position. In the present embodiment, the gate hole 47 (see FIG. 3) is zigzag-shaped in the rightward and leftward direction, but extends in the substantially forward and rearward direction. The neutral position of the shift lever 12 is set in a rear portion and a lower portion of the gate hole 47 (see FIG. 3). Because of this arrangement, in the state where the shift lever 12 is set in the neutral position, the knob 62 of the shift lever 12 can be located in a relatively low position. In other words, the above positional relationship between the parking brake lever 13 and the shift lever 12 can be accomplished without a need to increase a size of the parking brake lever 13 for the purpose of increasing a length of a portion protruding from the rear tilted section 50.

As shown in FIG. 3, the grab member 17 is positioned closer to the passenger seat 6 than the center of the console box 10 in the rightward and leftward direction. To be precise, the grab member 17 is positioned between the passenger seat 6 and the right side wall 42 of the console box 10. As shown in FIG. 4, the grab member 17 is positioned in front of the backrest 6a of the passenger seat 6 and in close proximity to the front edge of the seat bottom 6b of the passenger seat 6. In a state where the passenger is typically seated on the seat bottom 6b of the passenger seat 6, the passenger's back and shoulder are supported on the backrest 6a. In this posture, the passenger stretches a forearm closer to the center in the vehicle width direction, forward from behind, and grabs the grab member 17 with a hand close to the center. The grab member 17 extends substantially upward such that it is tilted forward. This allows the passenger to easily stretch the forearm, forward from behind and grab the grab member 17.

Figure 6:
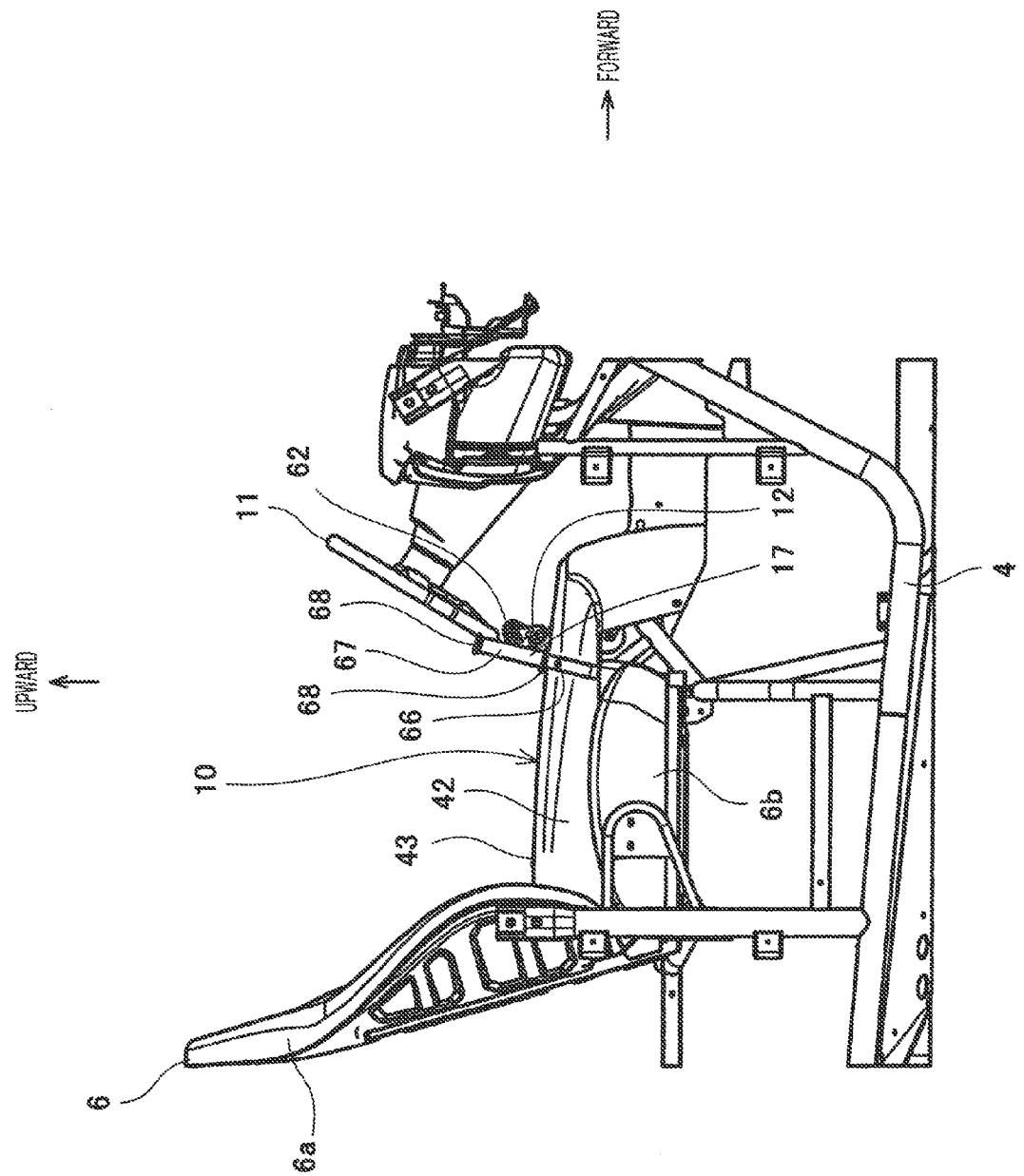
FIG. 6 is a right side view showing the region surrounding the driver seat and the passenger seat of the utility vehicle.

Referring to FIG. 6, the grab member 17 includes a pipe 66 rigidly coupled to the vehicle body frame 4 by welding, fastening, etc., and a grip 67 attached to the tip end portion of the pipe 66. The grip 67 has a cylindrical shape. The grip 67 has flanges 68 at its upper and lower ends thereof.

In accordance with the present embodiment, the shift lever 12 and the parking brake lever 13 are arranged between the driver seat 5 and the passenger seat 6 and are positioned closer to the driver seat 5 than the center of the console box 10 in the rightward and leftward direction. Because of this arrangement, the driver can perform a shifting operation and a parking braking operation using the hand closer to the center in the vehicle width direction. The shift lever 12, of the two levers 12 and 13 arranged closer to the driver seat 5, is positioned in front of the parking brake lever 13. Therefore, the driver stretches the forearm closer to the center in the vehicle width direction, forward from behind, and grabs the knob 62 of the shift lever 12. Therefore, the driver will not be forced to take a cramped posture.

In contrast, the grab member 17 is positioned between the driver seat 5 and the passenger seat 6 and closer to the passenger seat 6 than the center of the console box 10 in the rightward and leftward direction. In this way, the grab member 17 is positioned as close as possible to the passenger seat 6, and is away from the shift lever 12 and the parking brake lever 13 in the rightward and leftward direction. In this arrangement, the shift lever 12 and the parking brake lever 13 are mounted on the console box 10 to enable the driver to operate them conveniently. In addition, the passenger easily grabs the grab member 17.

The grab member 17 is positioned closer to the passenger seat 6 than the right side wall 42 (side wall closer to the passenger seat 6) of the console box 10. The console box 10 includes the console swelling section 43 and the lever mounting section 44 which are arranged side by side in the rightward and leftward direction, and the lever mounting section 44 is lower in height than the console swelling section 43. The shift lever 12 and the parking brake lever 13 are arranged on the lever mounting section 44, while the grab member 17 is positioned closer to the passenger seat 6 than the console swelling section 43. The console swelling section 43 extends forward up to a location sandwiched between the shift lever 12 and the grab member 17. The grab member 17 is positioned such that the grab member 17 and the shift lever 12 are arranged side by side in the rightward and leftward direction as viewed from above, but the console swelling section 43 is positioned between them. Because of this arrangement, the passenger cannot touch the shift lever 12 and the parking brake lever 13 without stretching the hand to the lever mounting section 44 beyond the right side wall 42, the console swelling section 43 and the vertical wall section 45. On the other hand, the grab member 17 is positioned closer to the passenger seat 6 than the vertical wall section 45, the console swelling section 43 and the right side wall 42. This allows the passenger to grab the grab member 17 more easily.

Figure 7:
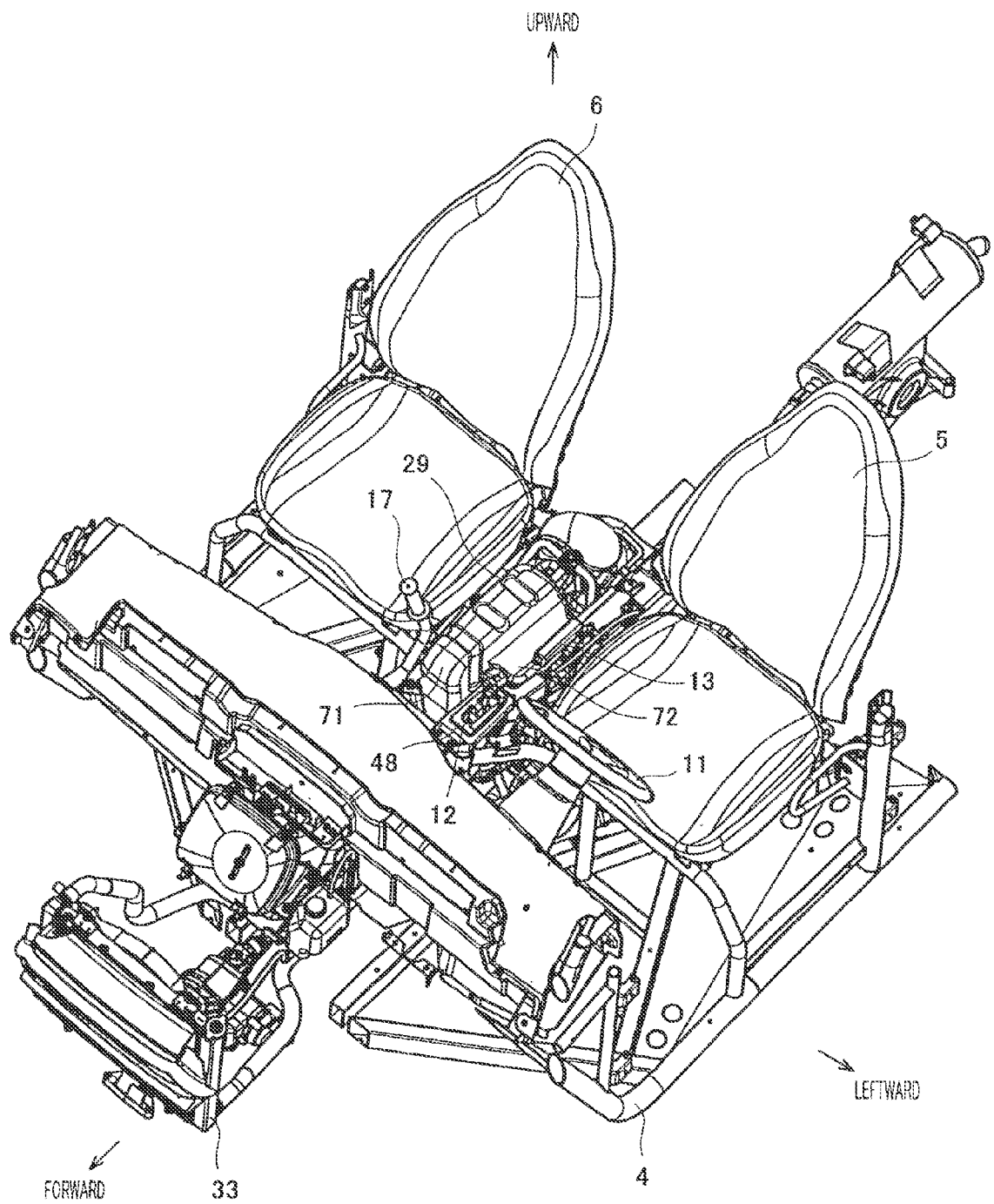
FIG. 7 is a perspective view showing a state where the console box is omitted from the components of FIG. 3.
Figure 8:
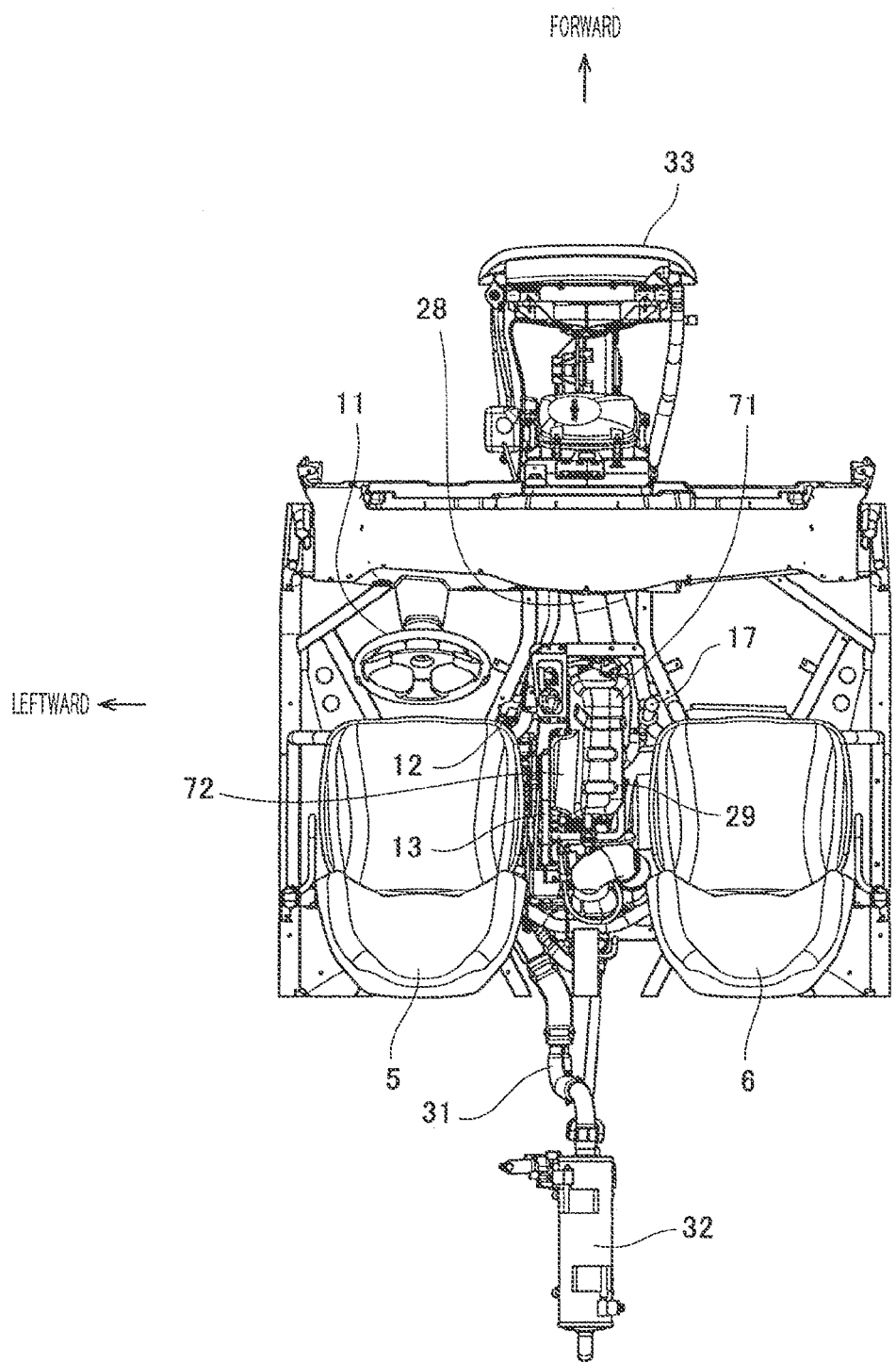
FIG. 8 is a plan view showing a state where the console box is omitted from the components of FIG. 4.

FIG. 7 is a perspective view showing a state where the console box 10 is omitted from the components of FIG. 3. FIG. 8 is a plan view showing a state where the console box 10 is omitted from the components of FIG. 4. Referring to FIGS. 7 and 8, the air-intake chamber 29 is accommodated into the console box 10. The air-intake chamber 29 has a chamber swelling section 71 conforming in shape to the console swelling section 43 of the console box 10. Like the console swelling section 43, the chamber swelling section 71 extends forward up to a location sandwiched between the shift lever 12 and the grab member 17. The air-intake chamber 29 has a protruding section 72 protruding toward the driver seat 5. The protruding section 72 is accommodated in a space below an intermediate portion between a portion (front tilted section 46) of the lever mounting section 44 (see FIGS. 3 and 4), where the shift lever 12 is disposed, and a portion (rear tilted section 50) of the lever mounting section 44 where the parking brake lever 13 is disposed.

Since the console swelling section 43 is configured in the above stated manner, the grab member 17 can be positioned physically away from the shift lever 12 and the parking brake lever 13 which are the driving operation members. In addition, an empty space can be formed inside the console box 10. The air-intake chamber 29 of a relatively large volume can be disposed in this space.

Although the embodiment of the present invention has been described above, the above configuration can be suitably altered within a scope of the present invention. For example, the driving operation members mounted onto the console box 10 are in no way limited to the shift lever 12 and the parking brake lever 13.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a driver seat;
a passenger seat positioned such that the passenger seat and the driver seat are arranged side by side in a rightward and leftward direction;
a console box provided between the driver seat and the passenger seat;
a shift lever operated by a driver to perform a shifting operation;
a parking brake lever operated by the driver to perform a braking operation and positioned behind the shift lever;
a grab member provided in a vicinity of the passenger seat and secured to a vehicle body frame; and
an air-intake chamber for supplying air taken in from outside to an engine and being accommodated in the console box;
wherein the shift lever and the parking brake lever are provided between the driver seat and the passenger seat and are positioned closer to the driver seat than a center of the console box in the rightward and leftward direction;
the grab member is provided between the driver seat and the passenger seat and is positioned closer to the passenger seat than the center of the console box in the rightward and leftward direction;
the console box has a console swelling section which extends in substantially a forward and rearward direction and swells upward in a substantially center portion of the console box in the rightward and leftward direction, and a lever mounting section which is positioned closer to the driver seat than the console swelling section and is lower in height than the console swelling section; and
the shift lever and the parking brake lever are arranged on the lever mounting section such that the shift lever and the parking brake lever are substantially aligned in the forward and rearward direction, and the grab member is positioned closer to the passenger seat than the swelling section;
the air-intake chamber has a chamber swelling section conforming in shape to the console swelling section;
with the parking lever being in a brake-OFF position, the parking lever overlaps the chamber swelling section in side view.

2. The utility vehicle according to claim 1,
wherein the console box has a side wall extending in a substantially vertical direction and in a substantially forward and rearward direction in a location closer to the passenger seat; and
the grab member is positioned closer to the passenger seat than the side wall.

3. The utility vehicle according to claim 1,
wherein a front end portion of the air-intake chamber and the swelling section are sandwiched between the grab member and the shift lever.

4. The utility vehicle according to claim 1,
wherein the air-intake chamber has a protruding section protruding toward the driver seat, the protruding section being accommodated in a space below an intermediate portion between a portion of the lever mounting section where the shift lever is disposed, and a portion of the lever mounting section where the parking brake lever is disposed.

* * * * *